C. M. Titus.
Horse-Rake.
№ 2937 Reissued May 19, 1868.
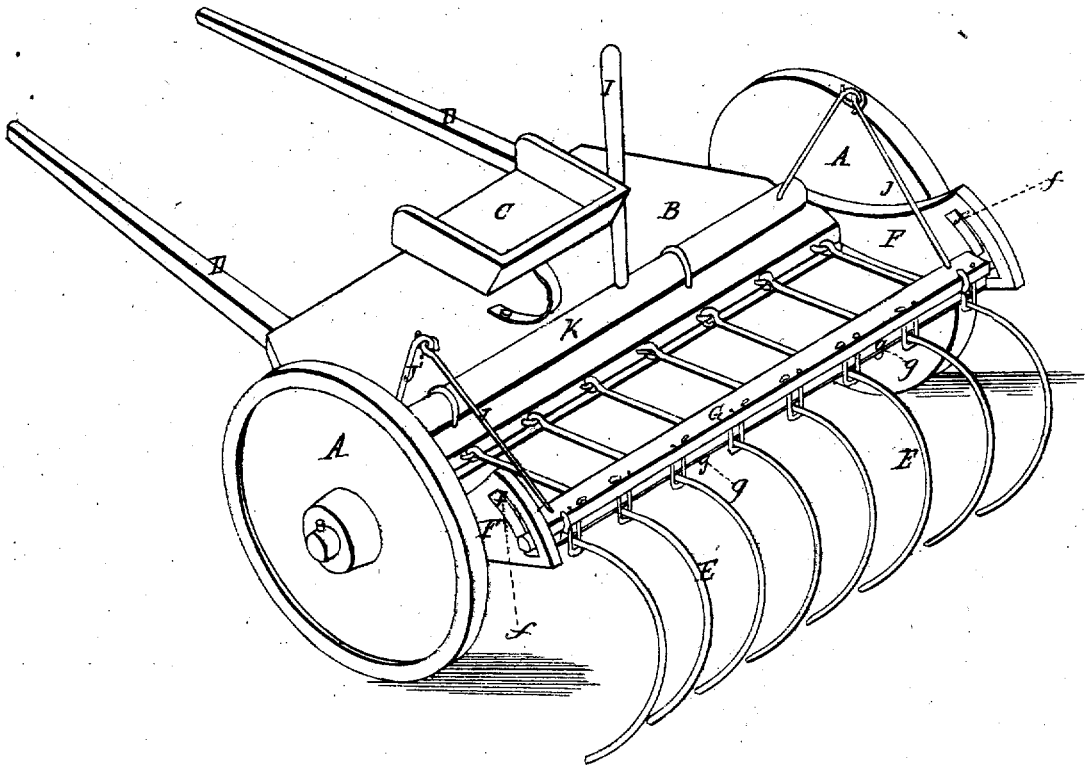
Witnesses
N. B. Smith
Alex. Mahon
Inventor
C. M. Titus assignor
by his attorney
Adonis M. Smith

UNITED STATES PATENT OFFICE.

C. M. TITUS, OF ITHACA, NEW YORK, ASSIGNEE, BY MESNE ASSIGNMENTS, OF E. L. BERGSTRESSER, OF HUBLERSBURG, PENNSYLVANIA.

IMPROVEMENT IN HORSE-RAKES.

Specification forming part of Letters Patent No. 36,268, dated August 26, 1862; Reissue No. 2,937, dated May 19, 1868.

*To all whom it may concern:*

Be it known that E. L. BERGSTRESSER, of Hublersburg, Centre county, (formerly of Berrysburg, Dauphin county,) Pennsylvania, invented certain Improvements in Horse-Rakes, of which the following is a full and exact description, reference being had to the accompanying drawings, making part of the same.

The invention consists in the employment of a lifting or pressure bar, arranged over the rake-teeth, and provided with pendent lifting staples or loops, in such manner that the pressure for holding the rake-teeth down to their work is applied through the bar, while the teeth are raised to discharge their load, or for transportation, by the hanging staples in the bar.

In the accompanying drawing, A represents the carrying-wheels; B, the frame or platform; C, the driver's seat; D, the shafts, and E the spring-teeth, all of which parts may be of any usual or desired construction and arrangement. F are projecting side pieces, attached to the frame immediately over the axle, and extending in rear of the same. Said side pieces are expanded at their rear ends, and are provided with curved slots *f*, in which the opposite ends of a horizontal transverse pressure-bar, G, move as the latter is adjusted up and down.

The bar G is arranged over the teeth E, and is provided with a spring, *g*, which serves to give elasticity to the pressure of the bar upon the teeth.

The lower face of the bar is furnished with a series of pendent staples or loops, through which the rake-teeth pass, and which serve to steady and space the teeth, and, when the bar G is elevated, to raise the teeth with the bar.

The bar G is connected with the lever I by means of uprights J, arms J′, and rock-shaft K, or equivalent devices, in such manner that the driver, in his seat, by moving lever I forward or backward, can raise the bar and teeth for discharging the gathered load, or can hold the teeth down to their work with any required degree of pressure.

What is claimed as new, and sought to be secured by Letters Patent, is—

1. A lifting or pressure bar provided with hanging loops or staples, by means of which the rake-teeth are lifted to discharge their load.

2. The pendent loops or staples, in combination with the rake-teeth and lifting-bar, all arranged as described.

3. The lifting or pressure bar provided with lifting loops or staples, in combination with a lever connected therewith for operating the same, as described.

C. M. TITUS.

Witnesses:
WM. L. BOSTWICK,
P. F. SISSON.